United States Patent [19]

Goedder

[11] Patent Number: 5,237,730
[45] Date of Patent: Aug. 24, 1993

[54] APPARATUS AND METHOD FOR FITTING A FLEXIBLE STRIP AROUND A VEHICLE DOOR OPENING

[75] Inventor: Dieter Goedder, Erkelenz, Fed. Rep. of Germany

[73] Assignee: Draftex Industries Limited, Edinburgh, Scotland

[21] Appl. No.: 886,626

[22] Filed: May 21, 1992

Related U.S. Application Data

[60] Division of Ser. No. 466,511, Jan. 17, 1990, Pat. No. 5,155,890, which is a continuation-in-part of Ser. No. 346,477, May 2, 1989, abandoned.

[30] Foreign Application Priority Data

Dec. 20, 1988 [GB] United Kingdom ............... 8829654
Nov. 6, 1989 [GB] United Kingdom ............... 8925207

[51] Int. Cl.$^5$ ........................................... B23P 21/00
[52] U.S. Cl. .................................. 29/235; 29/243.5; 29/243.58
[58] Field of Search ............... 29/235, 238, 240, 243.5, 29/243.58, 281.1

[56] References Cited

U.S. PATENT DOCUMENTS

4,620,354 11/1986 Hess et al. .............................. 29/417
5,031,293 7/1991 Goedderz et al. ..................... 29/235

Primary Examiner—P. W. Echols
Assistant Examiner—David P. Bryant
Attorney, Agent, or Firm—Leydig, Voit & Mayer

[57] ABSTRACT

A robot arrangement for mounting a sealing strip on a mounting flange comprises a robot hand supported at the end of a robot arm. The sealing strip is received by the robot hand at one position and driven through the hand to emerge at another position. Its emerging end is engaged by a spigot mounted on a pivotted finger. As the strip movement continues, this finger pivots and constrains the strip to follow a curved path around a guide roller. The robot arm then moves the robot hand towards the flange so that the now curved strip engages the flange 6. Thereafter the finger is moved by a motor out of engagement with the strip. The robot arm then drives the robot hand along the flange, thus laying the strip onto the flange.

3 Claims, 8 Drawing Sheets

APPARATUS AND METHOD FOR FITTING A FLEXIBLE STRIP AROUND A VEHICLE DOOR OPENING

This is a division of copending application Ser. No. 07/466,511, filed on Jan. 17, 1990 now U.S. Pat. No. 5,155,890, which was a continuation-in-part of application Ser. No. 346,477 filed May 2, 1989, now abandoned.

BACKGROUND OF THE INVENTION

The invention relates to apparatus and methods for fitting a flexible strip. For example, the strip may be a sealing strip which is required to be fitted around a door or other closable opening on a motor vehicle body.

BRIEF SUMMARY OF THE INVENTION

According to the invention, there is provided apparatus for use in mounting an elongate flexible channel-shaped strip onto a mounting flange or the like, comprising a portable body, and strip drive means carried by the body and arranged to feed the strip longitudinally along a predetermined path which is fixed in relation to the body and the distal part of which is external to the body and such as to present the strip for mounting on the flange as the body is moved along and in predetermined relation with the flange.

According to the invention, there is also provided a robot arrangement for mounting a longitudinal flexible sealing strip on a mounting flange around a closable opening on a motor vehicle body, the strip including a channel-shaped gripping part for embracingly gripping the flange, comprising: a robot hand including path defining means defining a predetermined path for the sealing strip, the final part of the path being external to the robot hand and being curved, the robot hand including motor-driven strip drive means for receiving an initial end of the sealing strip and driving the sealing strip along the path so that the mouth of the channel faces outwardly of the curvature of the final part of the path; and a robot arm supporting the robot hand and moving it towards the flange so that the mouth of the channel of the strip in the final part of the path embracingly grips the mounting flange, and including motor-driven arm drive means for thereafter moving the robot arm so that it carries the robot hand along and in predetermined relationship to the mounting flange so as to feed the strip into embracingly gripping relation with the flange.

According to the invention, there is also provided a method of mounting an elongate resilient channel-shaped strip on to a mounting flange or the like, comprising the steps of feeding the strip longitudinally towards the flange in a direction transverse to the length of the flange, constraining the initial end of the strip to follow a curved path so that the part of the strip immediately following the initial end presents the mouth of the channel to but spaced from the flange, moving the strip bodily towards the flange so that the said immediately following part of the strip embraces the flange and continuing to move the strip longitudinally and at the same time pressing it towards the flange so that the remainder of the strip embraces the flange.

DESCRIPTION OF PREFERRED EMBODIMENTS

Apparatus embodying the invention, and methods according to the invention, for fitting a sealing strip onto a motor vehicle door opening, will now be described by way of example only, with reference to the accompanying drawings in which.

DESCRIPTION OF PREFERRED EMBODIMENTS

Figure 1:
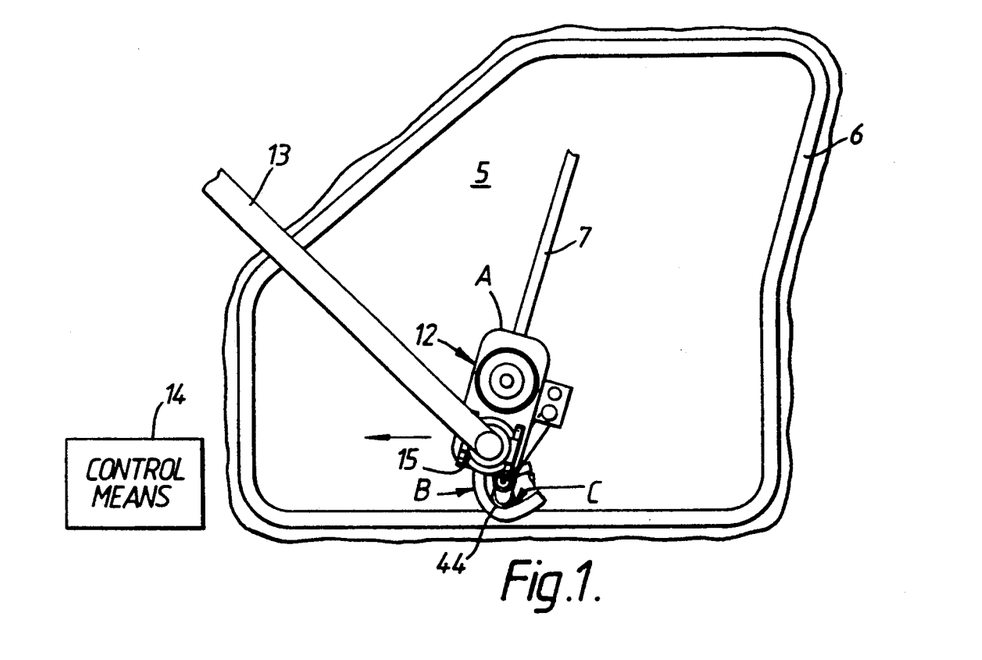
FIG. 1 is a side view of the door opening showing the apparatus in diagrammatic form.
Figure 2:
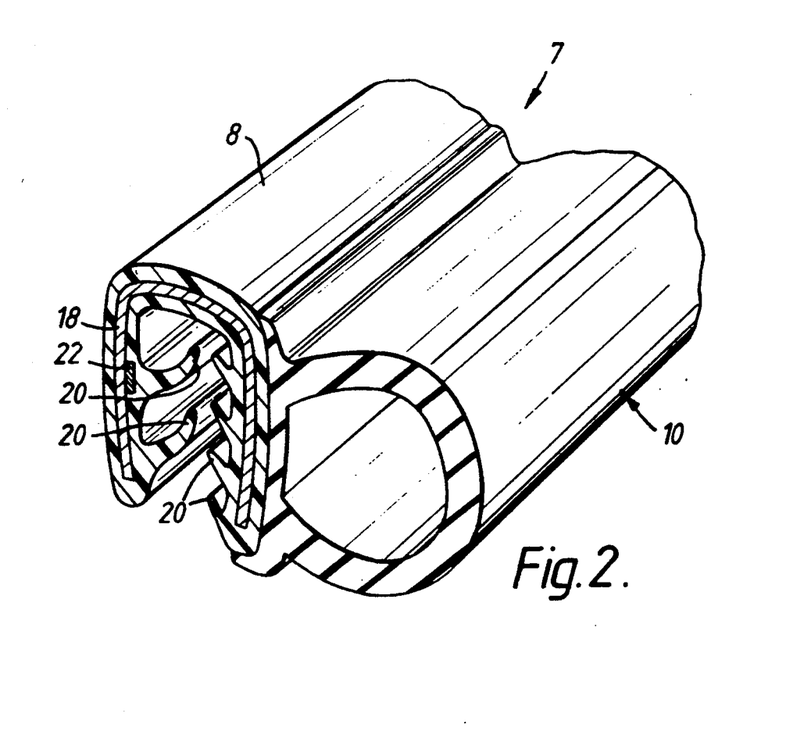
FIG. 2 is an enlarged perspective view of the sealing strip with its end sectioned.
Figure 3:
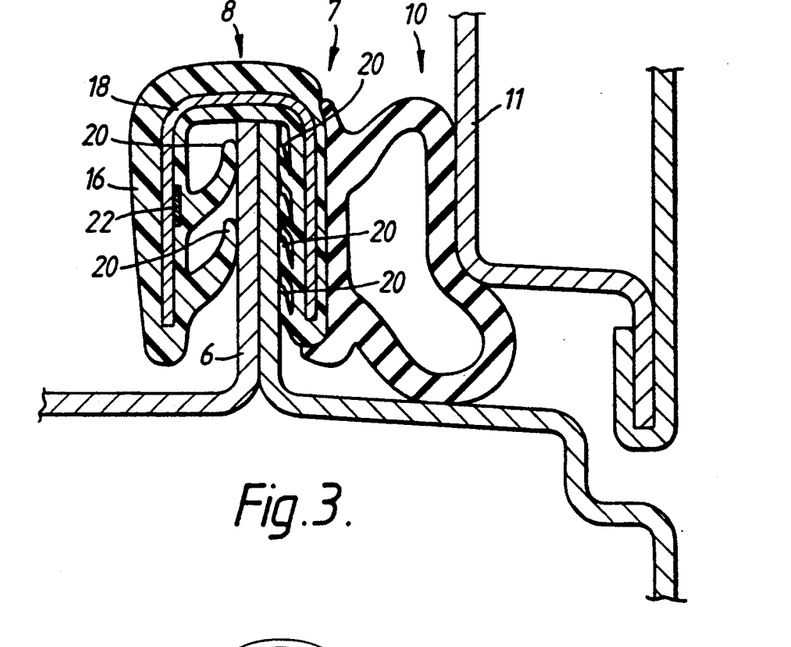
FIG. 3 is a cross-section of the sealing strip fitted onto a flange surrounding the opening.

FIG. 1 shows a door opening 5 of a motor vehicle body. The door opening is defined by a flange 6 which is formed where the inner and outer skins of the body are welded together. In order to provide a seal for the door opening 5, the manufacture of the car body involves the fitting of a door seal (see FIG. 2) onto the flange 6. As shown in FIG. 2, the door seal comprises a channel-shaped gripping section 8 which, in use, embracingly grips the flange 6, and supports a soft tubular sealing section 10, so that the seal runs around the door opening, with the sealing section on the outside of the opening. As shown in FIG. 3, when the door, part of which is shown diagramatically at 11, closes onto the opening, it partially compresses the tubular sealing section 10 so as to form weather-proof seal. The apparatus and method now to be described are concerned with the automatic fitting of the door seal 7 onto the flange 6.

The apparatus comprises two parts: a robot hand 12 as shown in FIG. 1, and a robot arm 13, the robot arm supporting the hand 12 by being attached to a fixture 15. The fixture 15 is best shown in FIG. 4.

In a manner to be described, a free end of a length of the seal 7 (whose length is sized to fit the periphery of the door opening) is fed into the hand as shown at A in FIG. 1 and the hand automatically grips it and presents the open mouth of the channel of the gripping section 8 towards the flange 6 as shown at B. The robot arm is programmed to move the hand 12 (under control of robot drive means not shown) towards the flange so that the gripping section grippingly embraces the flange 6 as shown at C. Thereafter, the robot arm moves the robot hand 12 around the periphery of the door opening and at an appropriate distance from the flange 6. During this movement, the hand automatically and continuously feeds the length of door seal onto the flange 6 until the hand has travelled around the complete periphery of the door opening. At the completion this travel, the distal end of the door seal will be placed in position on the flange immediately adjacent to the initial end. As the robot arm drives the robot hand 12 around the periphery, it automatically adjusts the angular position of the hand to take account of the corners and bends in the periphery and so that the angle of approach of the seal 7 is appropriate at all positions.

As shown more clearly in FIG. 3, the gripping section 8 is made of plastics or rubber material 16 which is extruded over a channel-shaped metal carrier 18. The extruded material 16 is extruded to form gripping and sealing lips 20 on the inside facing walls of the channel, and these make gripping and sealing contact with the side surfaces of the flange 6. The metal carrier may take any suitable form. For example, it may comprise a series of U-shaped metal elements arranged adjacent to each other to define a channel and either connected together by flexible connecting links or completely disconnected from each other. Instead, however, it may comprise wire looped to and fro and extending along the length of the channel. However, other forms of carrier can be used instead. The gripping section may incorporate a substantially inextensible tape or thread 22.

Figure 4:
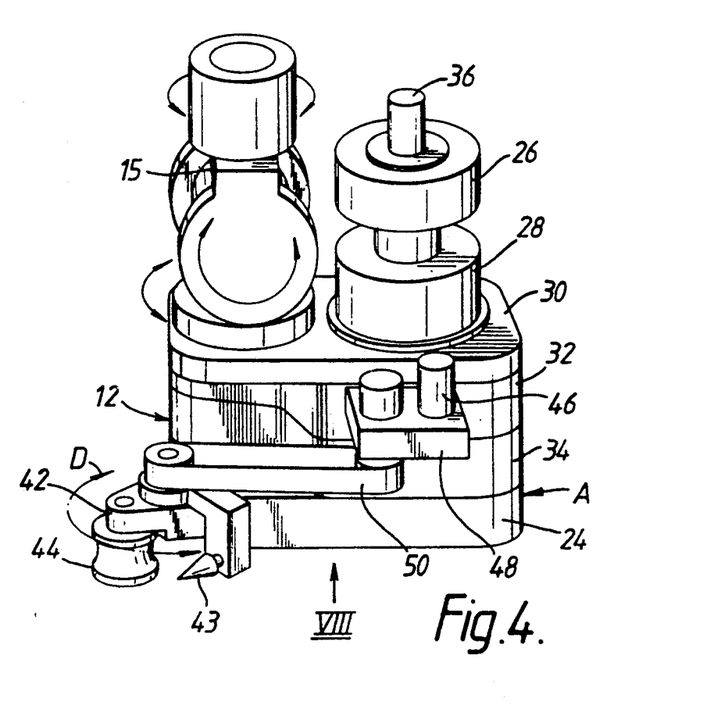
FIG. 4 is a perspective enlarged view of a robot hand forming part of the apparatus.

As shown in FIG. 4, the robot hand 12 comprises a seal drive section 24 containing three pairs of rollers (to be described below) which grip the sides of the seal and are driven so as to feed the seal longitudinally through the hand. These rollers are driven by a main motor 26 via a reduction gearbox 28. The drive shaft from the latter passes through a lid 30 to a belt driving section 32 which distributes the drive from the gearbox output shaft via a drive belt, to the three pairs of rollers in the seal drive section 24. The drive shafts from the belt driving section 32 to the pairs of drive rollers in the seal drive section 24 are supported in bearings in a bearing section 34.

A tachogenerator 36 monitors the speed of the motor 26.

Figure 5:
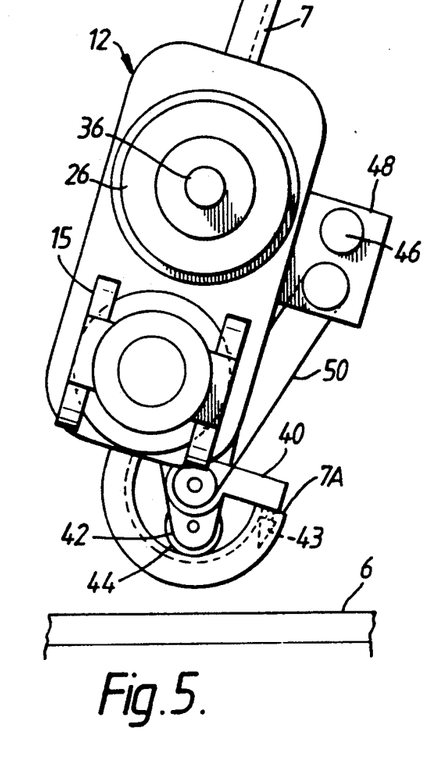
FIG. 5 is a side view of the robot hand in the operational state, immediately before the strip is placed on to the flange.

In a manner to be explained, the seal enters the seal drive section 24 at A and emerges at the opposite end of the section. At the exit point, guide finger 40 is positioned. Guide finger 40 is pivotally mounted on an arm 42 extending from the body of the seal drive section 24. The locus of the guide finger 40 is shown by the dotted line D. As shown in FIG. 4, the guide finger 40 carries a spigot 43 which is sized to be a relatively tight fit in the end of the channel-section of the seal 7. Initially, the guide finger 40 is positioned so that it is adjacent to the point where the seal emerges. As the seal emerges, its channel section 8 becomes locked on the spigot 43. As the seal continues to be driven, it swivels the guide finger 40 with it as shown in FIG. 5. Because its gripping section is locked to the spigot, the seal follows the substantially circular path D and comes into contact with a rotatable guide roller 44.

Figure 6:
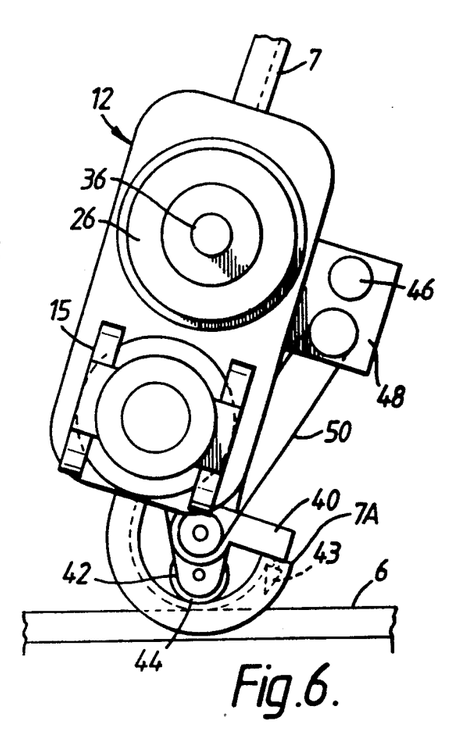
FIG. 6 corresponds to FIG. 5 but shows a later operational state.
Figure 7:
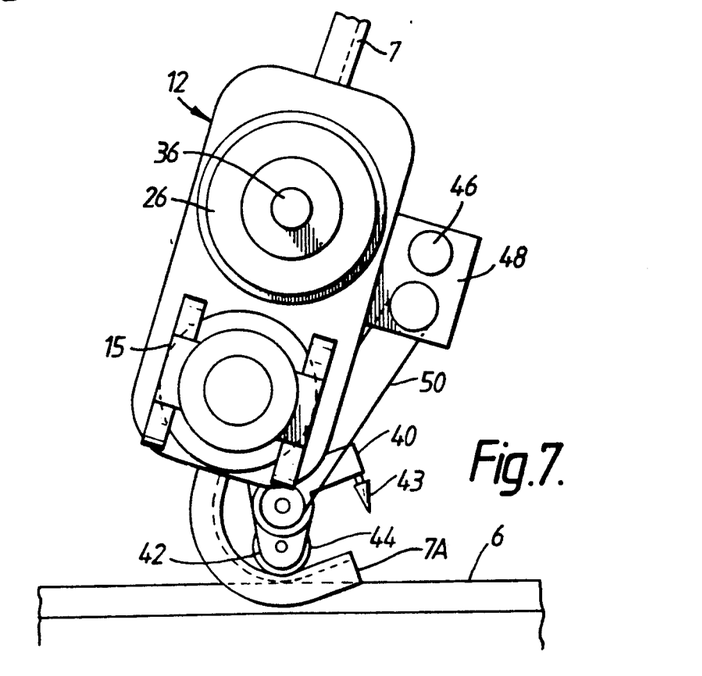
FIG. 7 corresponds to FIG. 6 but shows a still later operational state.

The robot arm now moves the robot hand 12 closer towards the flange 6 and the guide roller 44 presses the gripping section 8 onto the flange as show in FIG. 6. The guide finger is thereafter moved out of locking engagement with the seal end, this being carried out by means of a motor 46, a gearbox 48 and a belt 50, as shown in FIG. 7.

The robot arm then commences to drive hand 12 around the periphery of the door opening. During this process, the seal driving section 24 drives the seal through the hand at an appropriate rate, and the gripping section is thus laid firmly onto the flange by being guided and pressed on to the flange by the roller 44. When the robot hand 12 has been driven completely around the door opening, the distal end of the seal will pass through the seal drive section 24 and will be laid onto the flange 6 adjacent to the initial end.

The motor 46 (FIG. 4) is then energized so as to return the guide finger 40 to its initial position ready to receive a length of seal for the next door opening.

Figure 8:
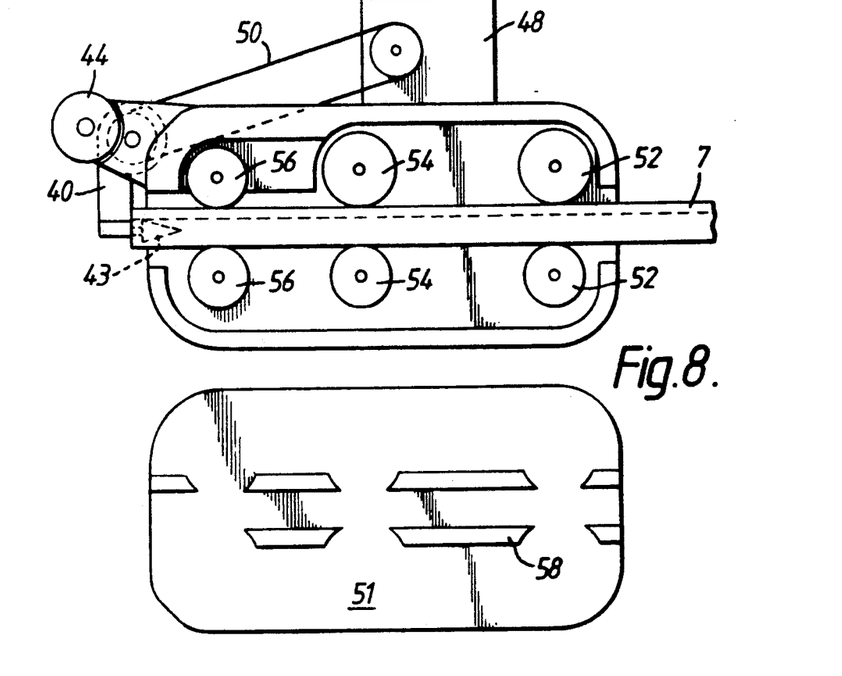
FIG. 8 is a view looking in the direction of the arrow VIII of FIG. 4.

FIG. 8 shows a view of the underside of the robot hand 12, looking in the direction of the arrow VIII in FIG. 4, and with a base 51 removed. This Figure shows the three pairs of rollers 52, 54 and 56 between which the seal 7 is gripped and driven longitudinally through the unit 12 as the rollers rotate. The base 51 is formed with raised guide portions 58 so as to guide the seal 7 successively from one pair of rollers to the next on initial pick-up.

Figure 9:
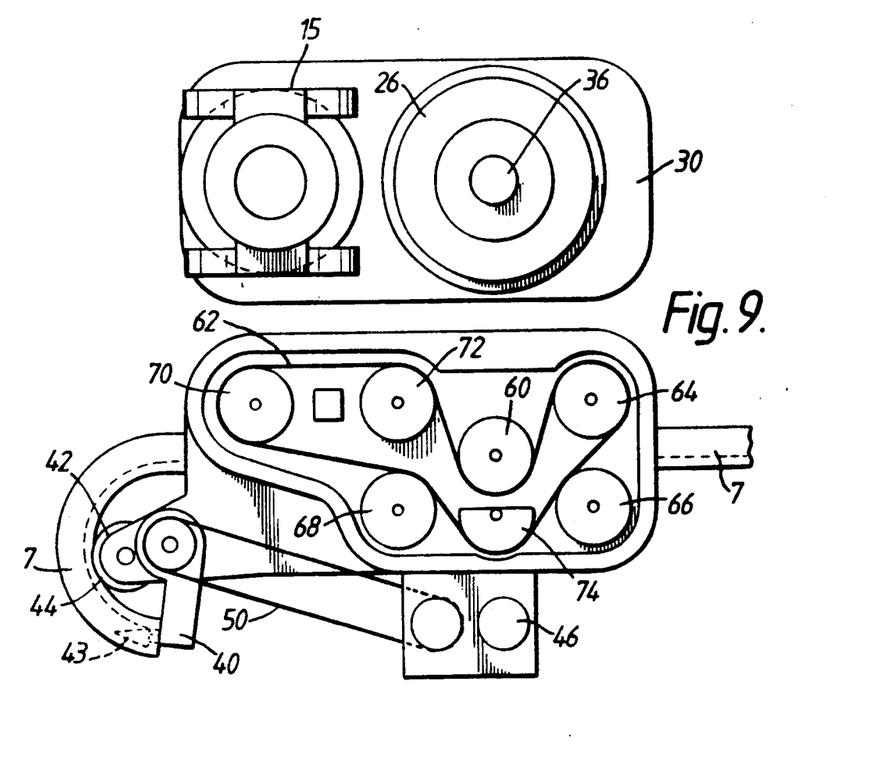
FIG. 9 is a partially dismantled view of the robot hand.

FIG. 9 shows a view of the robot hand 12 with the motor 26, the gearbox 28 and the lid 30 removed. As is clearly shown here, a main drive roller 60 is driven by the output shaft of the gearbox 28 and frictionally drives a continuous drive belt 62. Drive belt 62 passes successively around the drive rollers 64, 66, 68, 70 and 72. In addition, it passes around a spring-loaded belt tensioner 74. It will be apparent that, by means of suitable drive shafts passing through the bearing unit 34 (FIG. 4), drive rollers 64 and 66 rotate the pair of seal drive rollers 52 in the seal drive section 24, drive rollers 68 and 72 respectively drive the seal drive rollers of the pair 54, and roller 70 drives one of the pair of seal drive rollers 56, the other one thereof being freely rotatable.

Advantageously, the speed of the seal drive rollers 56, 52 and 54 is such, in relation to the angular movement of the robot arm, that the seal 7 is slightly compressed, lengthwise, as it is laid on the flange 6. This helps to offset the stretching effect which might otherwise occur and which would have the undesirable effect of laying the door seal partially under tension. If it were laid under tension, it would gradually resile over a period of time and this would have the effect that the two ends of the seal would part, leaving an unsightly gap and with defective weather sealing. This is avoided by laying the seal slightly compressed. The nominal length of the seal is predetermined taking this compression into account, so that the ends of the seal are fitted in contact with each other.

There may be less than three pairs of drive rollers.

The length of seal is supported in any suitable way, for example on the robot hand or the robot arm, during the fitting process.

The belt 50, and other moving parts of the robot hand would in practice be enclosed within protective coverings.

Figure 10:
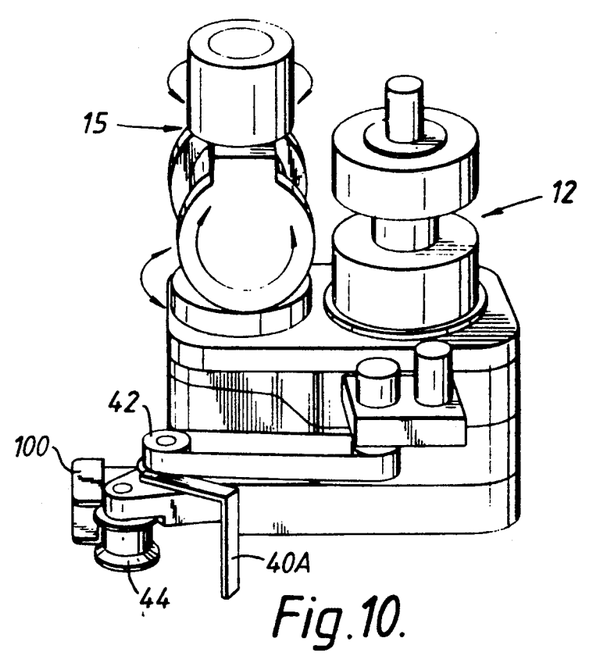
FIG. 10 corresponds to FIG. 4 but shows a modified form of the robot hand.

The robot hand 12 shown in FIG. 10 is identical, except for differences to be described below, to the robot hand shown in FIG. 4 and will not be described in full detail. The differences consist in the fact that (a) the robot hand 12 of FIG. 10 has a right-angled guide finger 40A which replaces the guide finger 40 and the spigot 43 in the robot hand of FIG. 4 and is pivotted (like the guide finger 40) on the arm 42, and (b) the robot hand 12 of FIG. 10 has the addition of a guide pusher 100. The guide pusher 100 is of channel-shape in cross-section (see FIG. 15 which shows a side view of part, only, of the robot hand), the width across the inside of the channel being slightly greater than the total width of the gripping section 8 and the sealing section 10 of the strip 7. Midway along the channel of the guide pusher 100 a baffle 102 is mounted. This baffle has a slit 104 in it which is sized to be a clearance fit over the flange 6, for a purpose to be described.

Figure 11:
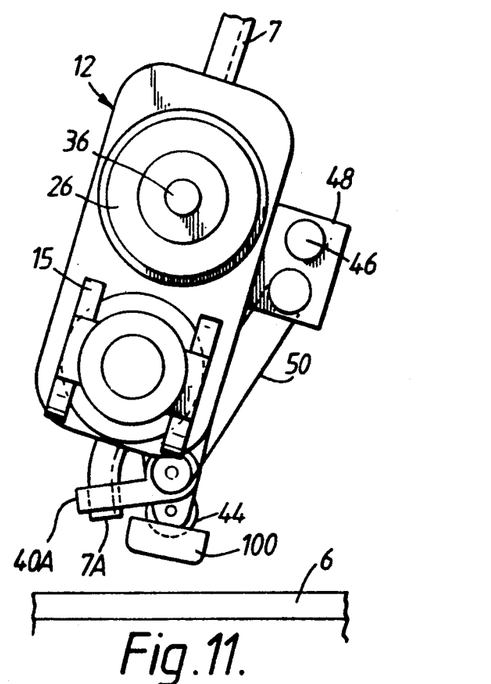
FIG. 11 is a side view of the robot hand of FIG. 10 as it receives a sealing strip.
Figure 12:
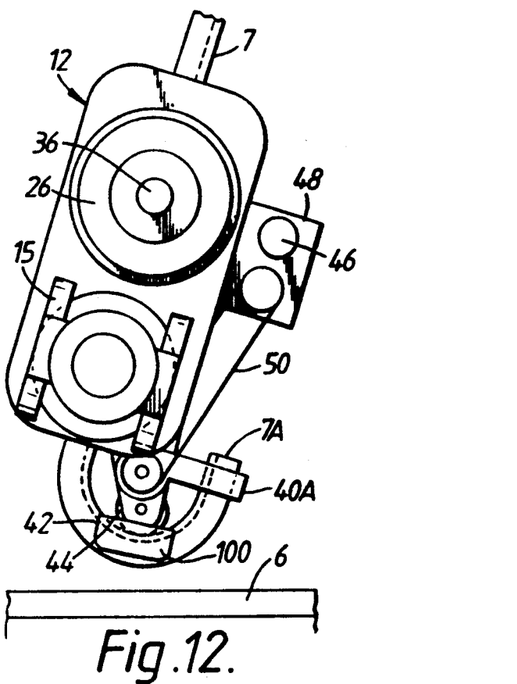
FIGS. 12 to 14 correspond to FIGS. 5 to 7 but show the robot hand of FIG. 10.

The purpose of the right-angled finger 40A is to guide the initial end of the seal 7 in a curved path as it emerges from the robot hand. As shown in FIG. 11, the emerging initial end 7A of the seal 7 contacts the finger 40A. As the seal continues to emerge, it is forced to follow a curved path defined by the locus of the guide finger 40A as it rotates about its pivot point on the arm 42. The seal is held in contact with the guide finge 40A by its own resilience. This process continues until the guide finger 40A reaches the position shown in FIG. 12, the seal following a substantially circular path and in contact with the roller 44.

Figure 13:
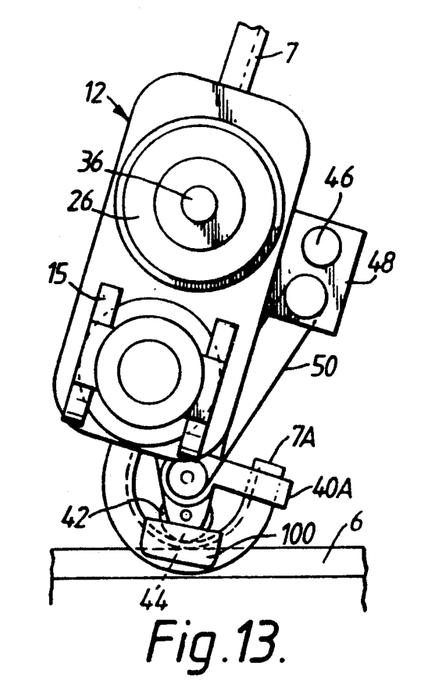
Figure 14:
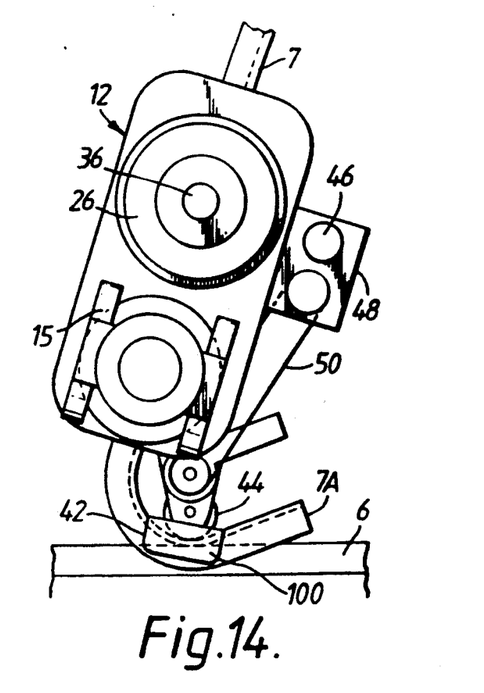

The robot arm now moves the robot hand 12 closer towards the flange 6 and the guide roller 44 presses the gripping section 8 on to the flange as shown in FIG. 13. The guide finge 40A is thereafter accelerated away from the end of the seal, this being carried out by means of the motor 46, the gear box 48 and the belt 50, as shown in FIG. 14.

The robot arm then drives the hand 12 around the periphery of the door opening, all in the manner described in the connection with FIGS. 1 to 9.

The motor 46 (FIG. 10) is then energised so as to return the guide finger 40A to its initial position ready to receive a length of seal for the next door opening.

During the foregoing process the guide pusher 100 is inoperative. However, it comes into effect for fitting the final end 7B of the seal onto the flange as will now be described.

Figure 16:
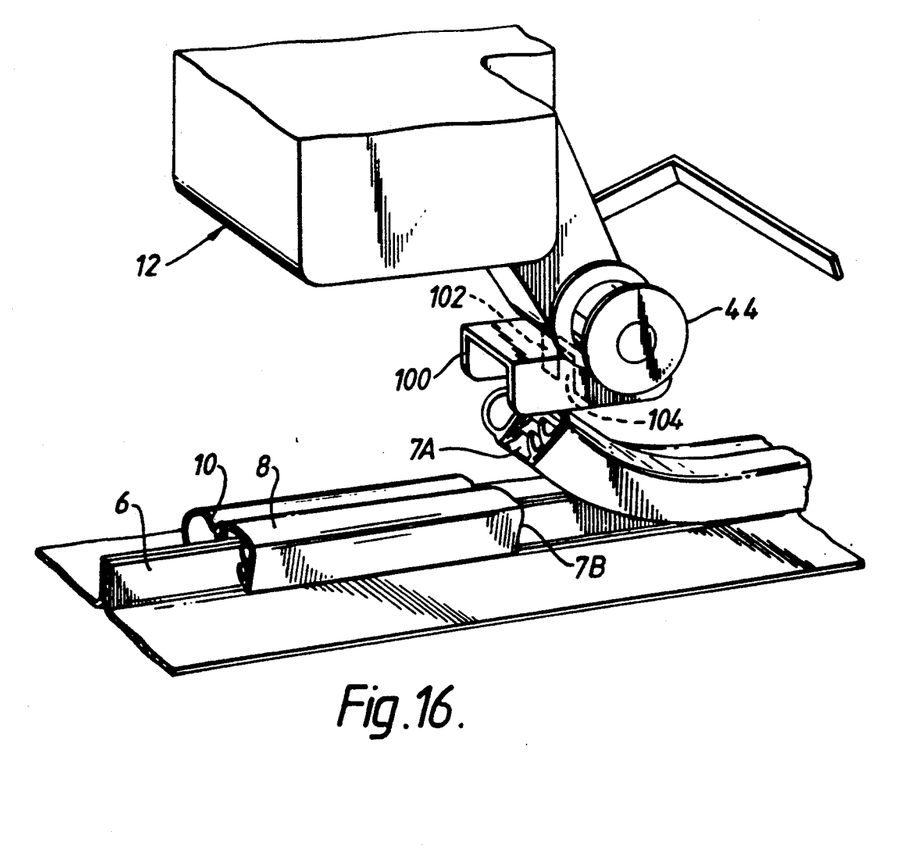
FIG. 16 is a perspective view of part of the robot hand of FIG. 10 at a position near to the completion of the fitting of the sealing strip.

FIG. 16 shows in diagrammatic form the situation when the robot hand 12 has travelled completely around the door opening and has laid the final end 7B of the seal 7 onto the flange 6. When this has occurred, the robot lifts the hand 12 (parts, only, of which are shown in the Figure) clear of the seal. The Figure shows that the final end 7B is of course laid immediately adjacent to the initial end 7A. However, the initial end 7A and the immediately adjacent part of the seal are clear of the flange - because of the manner in which the robot hand applies the seal to the flange (see FIGS. 11 to 14).

Figure 15:
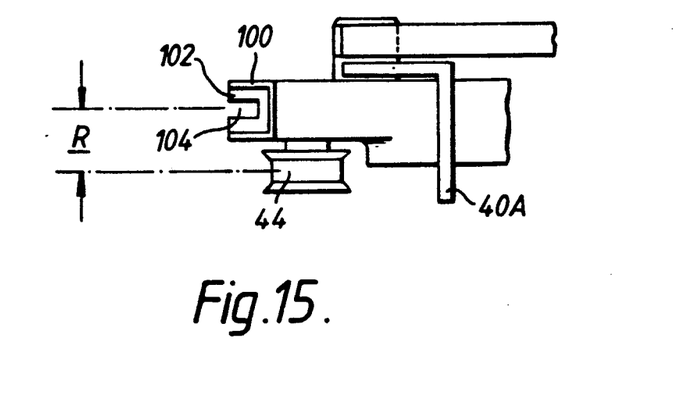
FIG. 15 is a side view of part of the robot hand of FIG. 10.

The robot hand now moves sideways relative to the flange, by a distance corresponding to the distance R in FIG. 15, so that the guide pusher 100 is now positioned immediately over the initial end 7A of the seal.

Figure 17:
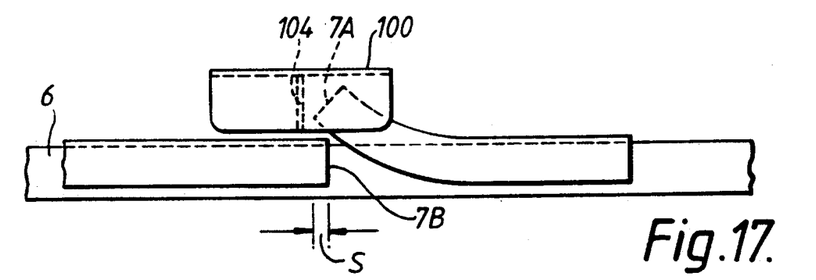
FIG. 17 is a diagrammatic view of a guide pusher of the robot hand of FIG. 16 at a stage in the fitting of the sealing strip immediately following that shown in FIG. 16.
Figure 18:
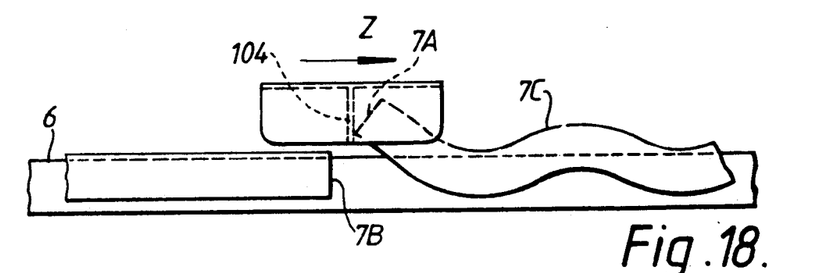
FIGS. 18 to 20 show stages immediately following that shown in FIG. 17.

The next stage in the proceedings is shown in FIG. 17 in which the robot hand is omitted, except for the guide pusher 100, for ease of explanation. As shown, the robot hand has now lowered the guide pusher 100 onto the initial end 7A of the seal, so that the latter end is now embraced by the guide pusher and close to but slightly to one side of the baffle 104. The initial and final ends 7A,7B of the strip slightly overlap as shown at S. The robot hand now moves the guide pusher 100 in the direction of the arrow Z as shown in FIG. 18. The baffle 102 now abuts the end 7A and pushes it to the right (as viewed in the Figure). This has the effect of "buckling" the sealing strip adjacent to the initial end 7A, as shown at 7C. The initial end 7A no longer slightly overlaps the final end 7B.

Figure 19:
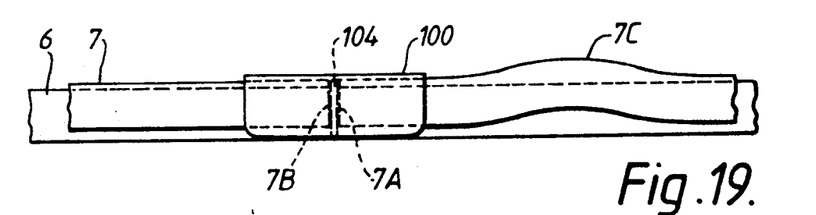

As shown in FIG. 19, the robot hand now moves the guide pusher downwardly so as to press the initial end 7A firmly onto the flange. The initial and final ends 7A and 7B are separated by the baffle 102 whose slot 104 embraces the flange itself.

Figure 20:
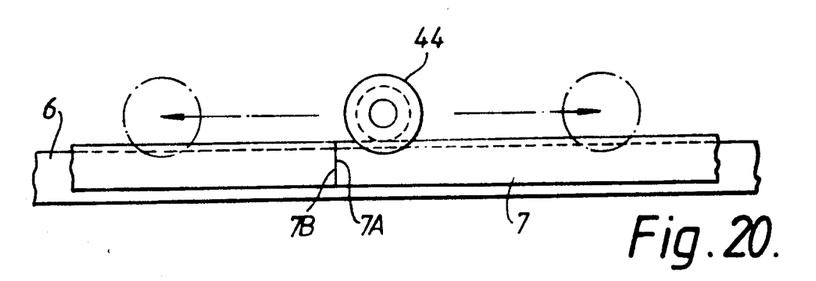

The robot hand is now raised relative to the flange and lifts the guide pusher 100 clear of the sealing strip (the latter being held on the flange 6 by the gripping action of the gripping section 8). The robot hand then moves sideways again relative to the flange, but in the opposite direction to the previous direction, so that the roller 44 is once more positioned over the sealing strip on the flange. The robot hand is then lowered to bring the roller 44 into contact with the strip on the flange and the roller is moved to and fro over the sealing strip by the robot hand and in the region of the location of the meeting ends 7A and 7B and presses the initial end 7A of the seal, and the immediately adjacent part of the seal, into complete engagement with the flange so that the two ends of the seal abut each other. The parts of the robot hand 12 except for the roller 44 are omitted from FIG. 20.

The sealing strip should advantageously be slightly compressible lengthwise and should have a length which is slightly greater than the peripheral length of the flange.

What is claimed is:

1. Apparatus for use in mounting a longitudinally extending resilient channel-shaped strip onto a mounting flange, the strip having an initial end and a final end and extending longitudinally between those ends, each end having a respective end face which is perpendicular to the longitudinal extension of the strip, the apparatus comprising a portable body, strip drive means carried by the body and arranged to feed the strip longitudinally along a predetermined path, with its initial end preceding its final end, the path being fixed in relation to the body and an end part of which path is curved and external to the body so that the strip, in moving along said end part of the path, presents the open mouth of its channel outwardly of the curve for presentation to and mounting on the mounting flange as the body moves along the length of the flange but leaving the initial end of the strip proud of the flange, pressing means carried by the body for pressing the strip onto the flange as the body moves along the length of the flange and operative to press the final end of the strip onto the flange immediately adjacent to the proud initial end, and pusher means mounted on the body for engaging at least part of the end face of the proud initial end and applying a force to that face in a direction which is transverse to that face and acting in the direction of longitudinal extension of the flange and away from the final end of the strip whereby to move the initial end of the strip away from the final end thereof and to permit the initial end of the strip to be pressed onto the flange adjacent to but spaced from the final end.

2. Apparatus according to claim 1, in which the pusher means comprises means defining a channel for loosely embracing the strip and a baffle situated within this channel for abutting the end face of the proud initial end of the strip for applying the said force thereto.

3. Apparatus according to claim 2, in which the baffle defines a slot for loosely embracing the flange as the pusher means moves towards the flange and the channel of the pusher means pushes the initial end of the strip onto the flange.

* * * * *

UNITED STATES PATENT AND TRADEMARK OFFICE
CERTIFICATE OF CORRECTION

PATENT NO. : 5,237,730

DATED : August 24, 1993

INVENTOR(S) : Dieter GOEDDERZ

It is certified that error appears in the above-identified patent and that said Letters Patent is hereby corrected as shown below:

On title page, item [19] and item [75] "Goedder" should read

--Goedderz--

Column 2, Line 62, after the word "form" insert -- a --.

Column 3, Line 16, after the word "completion" insert -- of --.

Signed and Sealed this

Twenty-second Day of March, 1994

Attest:

BRUCE LEHMAN

*Attesting Officer*          *Commissioner of Patents and Trademarks*